United States Patent
Moyal et al.

(10) Patent No.: US 12,097,868 B2
(45) Date of Patent: Sep. 24, 2024

(54) AIR MEASUREMENT FOR GROUND VEHICLE NAVIGATION

(71) Applicant: INTERNATIONAL BUSINESS MACHINES CORPORATION, Armonk, NY (US)

(72) Inventors: Shailendra Moyal, Pune (IN); Partho Ghosh, Kolkata (IN); Venkata Vara Prasad Karri, Visakhapatnam (IN); Sarbajit K Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 17/702,922

(22) Filed: Mar. 24, 2022

(65) Prior Publication Data

US 2023/0303094 A1   Sep. 28, 2023

(51) Int. Cl.
*G07C 5/08* (2006.01)
*B60W 50/02* (2012.01)
(Continued)

(52) U.S. Cl.
CPC ...... *B60W 50/029* (2013.01); *B60W 50/0205* (2013.01); *B60W 60/001* (2020.02);
(Continued)

(58) Field of Classification Search
CPC ............ B60W 50/029; B60W 60/001; B60W 50/0205; B60W 2555/20; B60W 2050/0215; B60W 2420/403; G07C 5/085
(Continued)

(56) References Cited

U.S. PATENT DOCUMENTS

| 7,516,010 B1 | 4/2009 | Kaplan et al. |
| 8,779,940 B2 | 7/2014 | Amir |

(Continued)

FOREIGN PATENT DOCUMENTS

| KR | 102088521 B1 | 3/2020 |
| WO | 2020124986 A1 | 6/2020 |

OTHER PUBLICATIONS

Lee et al., "Automatic Parking of Self-Driving Car Based on LIDAR," The International Archives of the Photogrammetry, Remote Sensing and Spatial Information Sciences, vol. XLII-2/W7, 2017, ISPRS Geospatial Week 2017, Sep. 18-22, 2017, Wuhan, China, 6 pages.

(Continued)

*Primary Examiner* — Marc Burgess
*Assistant Examiner* — Michael Tyler Evan Dowling
(74) *Attorney, Agent, or Firm* — Kelsey M. Skodje

(57) ABSTRACT

A navigation instruction of an autonomous vehicle is detected. The autonomous vehicle is in an environment. The autonomous vehicle is communicatively coupled to a plurality of sensors configured to capture environmental information of the environment. An anomalous sensor status of a first sensor of the plurality of sensors is determined based on the plurality of sensors. An air measurement is identified in response to the anomalous sensor status and based on a second sensor of the plurality of sensors. The air measurement is adjacent to the autonomous vehicle. Autonomous movement operation of the autonomous vehicle is directed in response to the movement instruction and based on the air measurement.

20 Claims, 3 Drawing Sheets

(51) Int. Cl.
    *B60W 50/029*   (2012.01)
    *B60W 60/00*    (2020.01)
(52) U.S. Cl.
    CPC ..... *G07C 5/085* (2013.01); *B60W 2050/0215* (2013.01); *B60W 2420/403* (2013.01); *B60W 2555/20* (2020.02)
(58) Field of Classification Search
    USPC .......................................................... 701/25
    See application file for complete search history.

(56) References Cited

U.S. PATENT DOCUMENTS

| | | | |
|---|---|---|---|
| 8,779,941 | B2 | 7/2014 | Amir |
| 8,983,726 | B2 | 3/2015 | Lee |
| 9,809,218 | B2 | 11/2017 | Elie et al. |
| 2014/0324266 | A1* | 10/2014 | Zhu .................. G01S 13/865 382/104 |
| 2015/0331977 | A1* | 11/2015 | Healey ................ G06F 17/11 703/2 |
| 2017/0131716 | A1* | 5/2017 | Brekke ................. G01C 21/20 |
| 2018/0154793 | A1* | 6/2018 | Jun .................... B60H 1/00778 |
| 2020/0339151 | A1* | 10/2020 | Batts ....................... B60Q 1/46 |

OTHER PUBLICATIONS

Ma et al., "Research Review on Parking Space Detection Method," MDPI Symmetry, 2021, 18 pages https://doi.org/10.3390/sym13010128.

Srinivasa, "Why does Radar outwit ultrasonic and other sensing technologies for blind spot detection?" Path Partner, Jan. 2, 2019, 4 pages, https://www.pathpartnertech.com/why-does-radar-outwit-ultrasonic-and-other-sensing-technologies-for-blind-spot-detection/.

Sandle, "Airflow visualisation in an aseptic facility," HVAC, Research Gate, May 2012, 4 pages https://www.researchgate.net/publication/292927032_Airflow_visualisation_In_an_aseptic_facility.

"Airflow Visualization," Microrite, 2022, 2 pages, https://www.microrite.com/our-company/our-focus/facilities-cleanroom/airflow-visualization/.

* cited by examiner

AIR MEASUREMENT FOR GROUND VEHICLE NAVIGATION

BACKGROUND

The present disclosure relates to vehicle navigation, and more specifically, to air-based navigation of a ground-based vehicle.

Vehicles may navigate based on one or more sensors, such as video and electromagnetic sensors. Increasingly, there is motivation to have vehicles navigate without the help of a human. For example, many vehicles may attempt to autonomously move through an environment. One area of autonomous vehicle movement is that of ground-based movement, that may rely on accurate navigational information from sensors.

SUMMARY

According to embodiments, disclosed are a method, system, and computer program product.

A navigation instruction of an autonomous vehicle is detected. The autonomous vehicle is in an environment. The autonomous vehicle is communicatively coupled to a plurality of sensors configured to capture environmental information of the environment. An anomalous sensor status of a first sensor of the plurality of sensors is determined based on the plurality of sensors. An air measurement is identified in response to the anomalous sensor status and based on a second sensor of the plurality of sensors. The air measurement is adjacent to the autonomous vehicle. Autonomous movement operation of the autonomous vehicle is directed in response to the movement instruction and based on the air measurement.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
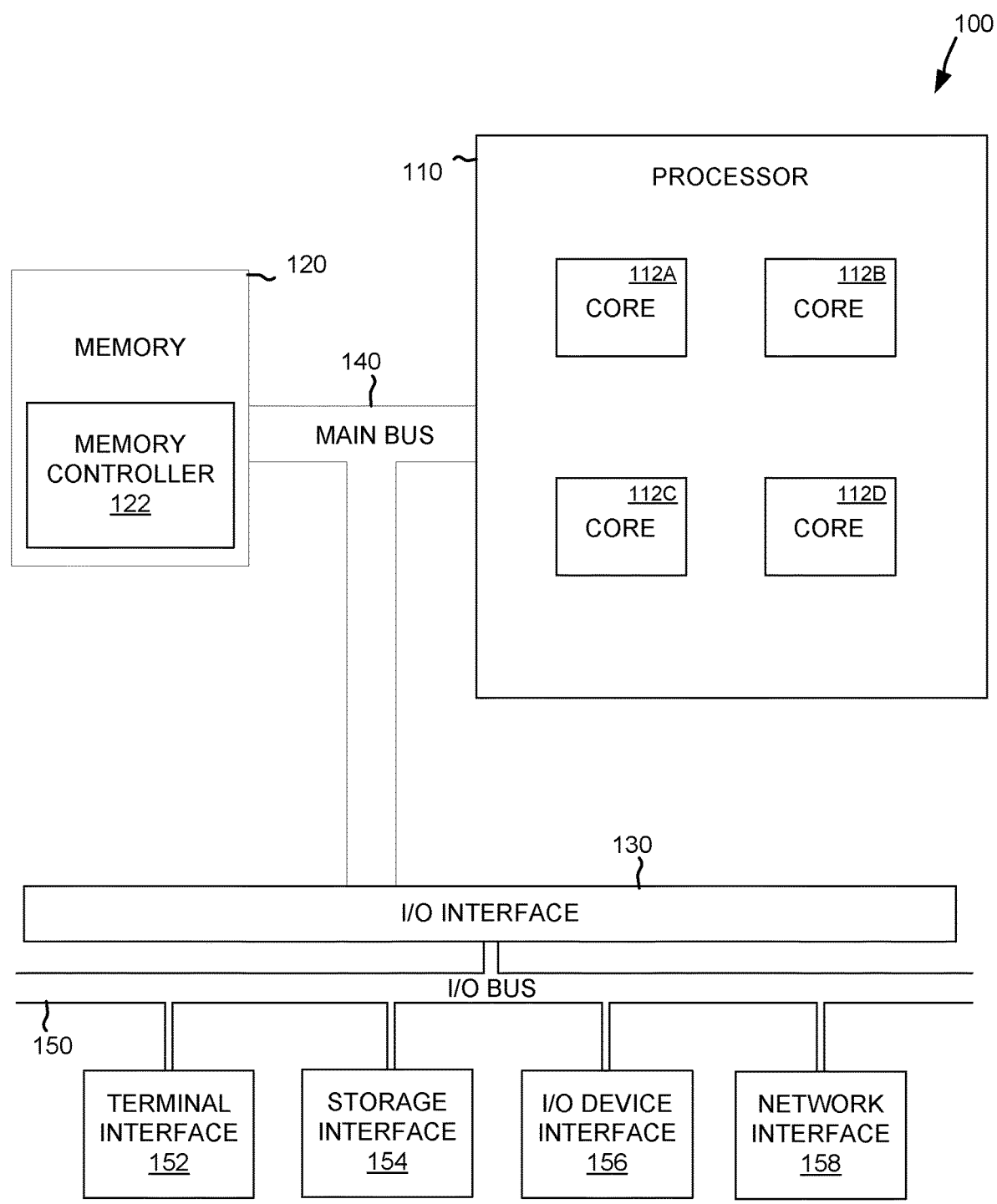
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to vehicle navigation; more particular aspects relate to air-based navigation of ground-based vehicles. While the present disclosure is not necessarily limited to such applications, various aspects of the disclosure may be appreciated through a discussion of various examples using this context.

Autonomous vehicles are becoming increasingly demanded throughout modern life for users. Autonomous vehicles may include cars, trucks, vans, or other ground-based vehicles that are capable of moving with little or no human input. Autonomous vehicles may incorporate various automations (e.g., servos, switches, motors) to perform autonomous movement, such as steering, acceleration, and deceleration.

Autonomous vehicles may affect or alter daily lives of many and may lead to changes in the residential, commercial, and industrial sectors. In a first instance, as users may use autonomous vehicles for daily transportation, vehicle ownership may lessen (e.g., autonomous taxis). In a second instance, users may utilize autonomous vehicles instead of rail, buses, or other forms of public transit. In a third instance, companies may offer to deliver or transport goods as the costs associated with autonomous vehicle delivery services change.

Autonomous vehicles may rely on successfully sensing an environment, in order to move safely without humans. For instance, autonomous vehicles may utilize a variety of sensors to perceive their surroundings, such as to identify appropriate navigation paths, physical obstacles, and relevant signage. The various sensors may include thermographic cameras, visible-wavelength images ("images"), radio detection and ranging ("RADAR"), light detection and ranging ("LIDAR"), sound navigation and ranging ("SONAR"), global positioning system ("GPS") receivers, Internet of Things ("IoT") sensors, etc. Accurate sensor information is necessary for the advanced control systems to interpret environmental information. For instance, vehicles may identify open parking spaces based on IoT sensor feeds (from IoT sensors installed in the parking spaces), LIDAR reflections off surfaces, and/or image feeds to identify an available parking space.

There may be drawbacks to the existing sensors and autonomous navigation systems. One drawback is that without accurate environmental information, autonomous vehicles may not be able to navigate through an environment safely in all conditions. For instance, if there is dust, smoke, or fog in an area, images and LIDAR may not be available or may be too distorted or inaccurate to enable autonomous movement. In another example, certain vegetation or landscape patterns, such as small irregular rocks and other textures, may confuse image-based navigation, as it may be difficult to ascertain depth information. As a result, it may be impossible to avoid hitting an object during inclement weather. Another drawback is that other sensors besides imaging and LIDAR may be ineffective in or too coarse for certain driving operations. Specifically, even vehicles that have additional sensors may not be able to perform navigation in all scenarios. For instance, GPS, RADAR, and SONAR sensors may not provide fine-grain or high-detailed enough information to accurately identify (and consequently avoid) trees or other relatively small objects. Further drawbacks relate to navigating in new or unmapped areas. Specifically, not all areas may have installed IoT devices that can communicate accurate and detailed information for low-speed safe autonomous movement. For example, many temporary parking places or parking grounds in open areas may not have sensors to assist in automated parking or space identification.

Air Measurement Vehicle Navigation ("AMVN") may provide advantages over other forms of autonomous vehicle navigation. AMVN may operate by employing airflow analysis in the surrounding of the vehicle to identify objects and to direct autonomous movement.

The AMVN may operate by identifying air measurements from air sensors. The air sensors may obtain various environmental information of the environment, such as air pressure, air currents, air speeds, air temperatures, direction of air, and the like. In some embodiments, the air sensors of the AMVN may be mounted to the vehicle directly. For example, an air-speed sensor may be mounted to the front of the vehicle. In some embodiments, the air sensors of the AMVN may be distal or separate from the vehicle but in the environment. For example, an air-pressure sensor may be mounted on other vehicles that are also navigating the environment. The air measurements from the air-pressure sensor may be communicated from other vehicles, through e.g., a vehicle network, to the autonomous vehicle.

The AMVN may operate to direct autonomous movement operation of an autonomous vehicle based on the air measurements. For example, based on measuring certain currents, speeds, temperatures, patterns or other relevant air measurements, the AMVN may direct a vehicle to move forward, backward, or steer to one side or the other. The AMVN may provide advantages in situations where other autonomous navigation systems may have trouble. For example, by utilizing air measurements, AMVN may operate where visible light cameras or electromagnetic sensors may fail, such as during fog, rain, or other conditions. In another example, by utilizing air measurements, AMVN may operate with greater precision than other sensors, such as RADAR or SONAR. In yet another example, by utilizing air measurements, the AMVN may operate in open areas or around irregular shapes such as near rocks, geological formations, trees, and vegetation.

The AMVN may operate by creating an air movement to be measured. In detail, an air generation device may be a part of the AMVN, such as being located on the vehicle or located on another vehicle or stationary area. The air generation device may be configured to generate, blow, project, disturb, or otherwise move air around an environment where a vehicle is navigating. In addition, or in the alternative, the air generation device may be considered an air movement creation device that is configured to create air movement (alternatively, air) that flows around in an environment of the vehicle. An air generation device may include any of the following: valves, solenoids, fans, blades, jets, compressors, a pneumatic device, or another relevant air-producing or air-generating device. The created air may bounce around and/or reflect off of objects in the environment. After bouncing off or around various objects, some of the air may be reflected back towards an air sensor of the AMVN. The generated air may be used by the air sensor of the AMVN to determine one or more objects in the environment and may be used as part of directing autonomous movement operation of the autonomous vehicle.

The AMVN may operate as part of an autonomous vehicle with other sensors. The autonomous vehicle may include electromagnetic sensors (such as RADAR and/or LIDAR), GPS sensors, visible light sensors, SONAR sensors, or other autonomous navigation and/or movement sensors. The AMVN augment or operate to fill in areas or situations where the other sensors may not operate successfully. Specifically, upon determining that one or more of the other sensors are operating in an anomalous manner, the AMVN may begin autonomous navigation and/or movement based on identified air measurements. For example, the AMVN may detect an anomalous status based on one or more of the other sensors.

The anomalous status may be that one of the other sensors fails to operate. Failing to operate may include a sensor that is unable to capture environmental information, such as a visual sensor cannot capture an image of the area. The anomalous status may be that one of the other sensors operates at a reduced functionality. A reduced functionality may include a sensor that is only able to capture environmental information that is degraded. For example, if a visual sensor is only able to capture an image with a reduced amount of resolution, the AMVN may begin to instruct operation by identifying air measurements. The determination of an anomalous sensor status may include identifying a predetermined threshold, such as a predetermined degradation threshold. There may be a predetermined degradation threshold for each of the other sensors of the autonomous vehicle that trigger AMVN operation. In a first example, a predetermined degradation threshold of a GPS sensor may be a degradation in resolution of the GPS sensor to below three meters of accuracy. In a second example, a predetermined degradation threshold of a LIDAR sensor may be a degradation in accuracy of object placement beyond one foot. In a third example, a predetermined degradation threshold of an image sensor that captures a video of an environment may be a degradation to below fifteen frames-per-second of video. In a fourth example, a vehicle that has a camera to visualize the surroundings, and the degradation of the camera may be a blind spot or a Field of View (FoV) limitation to capture an image of an entire object. In a fifth example, a vehicle that has a RADAR system may have a degradation that is a range limitation of a few meters away from the exterior surface of the vehicle.

The AMVN may be configured to generate a map of an environment based on air measurements ("air-based map") for later usage. In detail, an autonomous vehicle equipped with AMVN may perform routine routing and movement through various environments. For example, the autonomous vehicle may drive to a store with a parking lot and may perform parking on the west side of the store. In another example, the autonomous vehicle may drive to a wildlife park. During the routine routing, the autonomous vehicle may capture, based on air measurements, environmental information of the various environments at a first time. The first time may be a time when the autonomous vehicle is driven by a user, or when the autonomous vehicle may be successfully driven with the user of other sensors, such as GPS and LIDAR. Based on the captured environmental information, the AMVN may associate the air measurements with the environmental information. The associated measurements may be used at a second time for navigation and directing of movement of an autonomous vehicle. For purposes of description, a second time may be considered a time after the first time where the environmental information was captured. For example, a previously generated air-based map may be used to compare air measurements at a second time with the air and to direct autonomous movement of the vehicle. The AMVN may utilize an AI to generate the air-based map and/or to perform autonomous navigation and movement.

In some embodiments, the system, computer program product, and method described herein may use an artificial intelligence. "Artificial Intelligence" (AI) may be one example of cognitive systems that relate to the field of computer science directed at computers and computer behavior to perform computer-specific operations that solve problems and develop solutions in a different manner than humans solve similar problems. AI may utilize algorithms that use, for example, and without limitation, data analysis, machine learning, visual recognition, behavioral monitoring, neural networking, and natural language processing (NLP) to solve problems and optimize various data processes. The AI may analyze one or more collections of relevant input as subject matter data as received from the sources as discussed herein. As the subject matter data is received, organized, and stored, the AI may analyze the data to determine the relevant details through computational analytical tools which allow the associated systems to learn, analyze, and understand, including within the context of the present disclosure. With such an understanding, the AI may surface concepts and categories. In addition to solving problems and developing solutions in a different manner than humans, the AI may also be taught to analyze data and behaviors of man-made and natural systems.

In addition, cognitive systems such as AI, may make decisions based on information which maximizes the chance of success in a given topic. More specifically, AI may learn from a dataset to solve problems and provide relevant or appropriate contextual recommendations. For example, in the field of AI computer systems, machine learning (ML) systems may process large volumes of data, seemingly related or unrelated. The ML systems may be trained with data derived from a database or corpus of knowledge, as well as recorded behavioral data. The ML systems may look for, and determine, patterns, or lack thereof, in the data, "learn" from the patterns in the data, and ultimately accomplish tasks without being given specific instructions. In addition, the ML systems—utilizing algorithms, represented as machine processable models may learn from the data and create foresights, insights, or other applicable predictions based on this data. More specifically, ML may include the application of AI, such as, and without limitation, through creation of neural networks ("NN") that can demonstrate learning behavior by performing tasks that are not explicitly programmed. Deep learning may include a type of ML in which systems can accomplish complex tasks by using multiple layers of choices based on output of a previous layer, creating increasingly intuitive and abstract conclusions.

ML systems may have different "learning styles." One such learning style is supervised learning, where the data is labeled to train the ML system through indicating to the ML system what the key characteristics of a thing are with respect to its features, and what that thing actually is. If the thing is an object or a condition, the training process is called classification. Supervised learning includes determining a difference between generated predictions of the classification labels and the actual labels, and then minimize that difference. If the thing is a number, the training process is called regression. Accordingly, supervised learning specializes in predicting the future.

A second learning style is unsupervised learning, where commonalities and patterns in the input data are determined by the ML system through little to no assistance by humans. Many unsupervised learning focuses on clustering, e.g., grouping the data by some set of characteristics or features. These may be the same features used in supervised learning, although unsupervised learning typically does not use labeled data. Accordingly, unsupervised learning may be used to find outliers and anomalies in a dataset, and cluster the data into several categories based on the discovered features.

Semi-supervised learning is a hybrid of supervised and unsupervised learning that includes using labeled as well as unlabeled data to perform certain learning tasks. Semi-supervised learning permits harnessing the large amounts of unlabeled data available in many use cases in combination with typically smaller sets of labelled data. Semi-supervised classification methods are particularly relevant to scenarios where labelled data is scarce. In those cases, it may be difficult to construct a reliable classifier through either supervised or unsupervised training. This situation occurs in application domains where labelled data is expensive or difficult obtain, like computer-aided diagnosis, drug discovery and part-of-speech tagging. If sufficient unlabeled data is available and under certain assumptions about the distribution of the data, the unlabeled data can help in the construction of a better classifier through classifying unlabeled data as accurately as possible based on the documents that are already labeled.

A third learning style is reinforcement learning, where positive behavior is "rewarded: and negative behavior is "punished." Reinforcement learning uses an "agent," the agent's environment, a way for the agent to interact with the environment, and a way for the agent to receive feedback with respect to its actions within the environment. An agent may be anything that can perceive its environment through sensors and act upon that environment through actuators. Therefore, reinforcement learning rewards or punishes the ML system agent to teach the ML system how to most appropriately respond to certain stimuli or environments. Accordingly, over time, this behavior reinforcement facilitates determining the optimal behavior for a particular environment or situation.

Deep learning may include a method of machine learning that incorporates neural networks in successive layers to learn from data in an iterative manner. Neural networks are models of the way the nervous system operates. Basic units are referred to as neurons, which are typically organized into layers. The neural network works by simulating a large number of interconnected processing devices that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. At a basic level, each layer of the neural network includes one or more operators or functions operatively coupled to output and input. Output from the operator(s) or function(s) of the last hidden layer is referred to herein as activations. Eventually, a result is delivered from the output layers. Deep learning complex neural networks are designed to emulate how the human brain works, so computers can be trained to support poorly defined abstractions and problems. Therefore, deep learning is used to predict an output given a set of inputs, and either supervised learning or unsupervised learning can be used to facilitate such results.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

Figure 2:
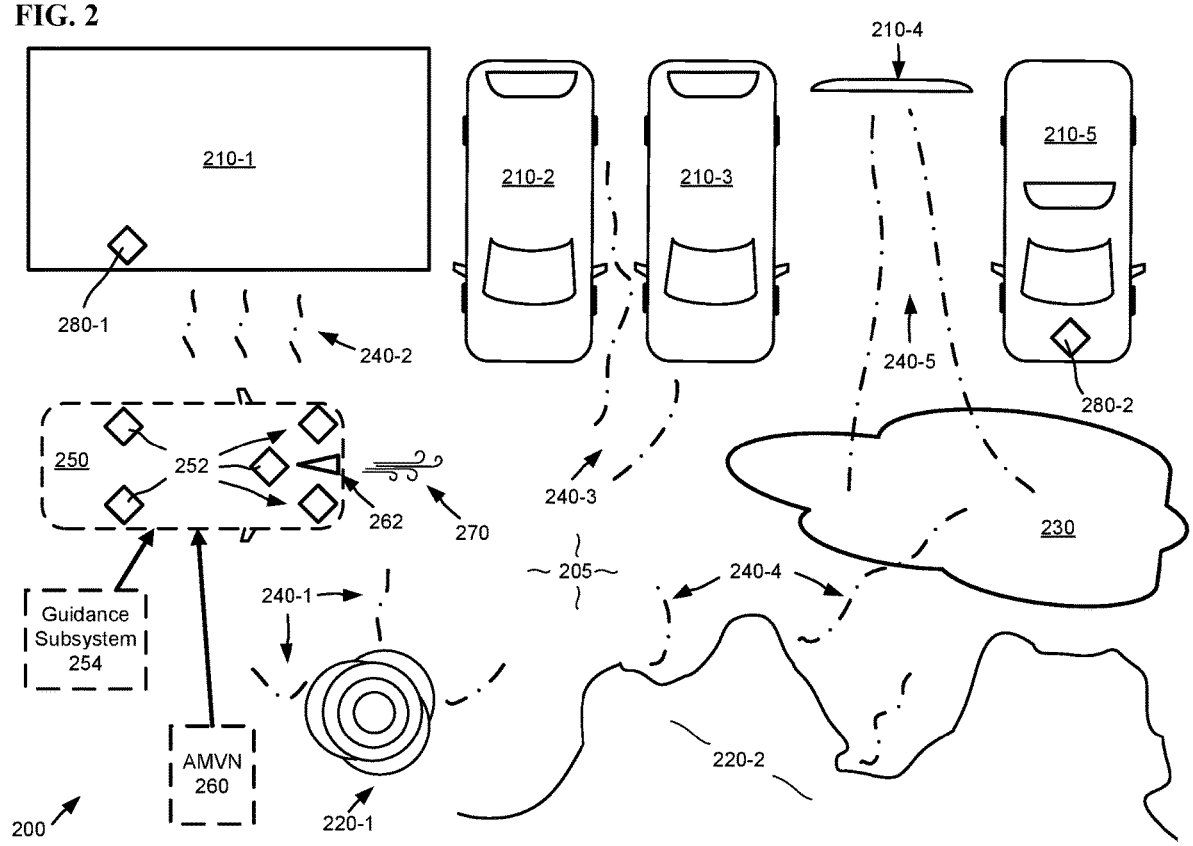
FIG. 2 depicts a system of navigating through an environment based on environmental information derived from air measurements, consistent with some embodiments of the disclosure.

FIG. 2 depicts a system 200 of navigating through an environment 205 based on environmental information derived from air measurements, consistent with some embodiments of the disclosure.

The environment 205 may include the following: a set of one or more first objects 210-1, 210-2, 210-3, 210-4, and 210-5 (collectively, first objects 210); a set of one or more second objects 220-1 and 220-2 (collectively, second objects 220); an environmental condition 230; and a set of one or more air streams 240-1, 240-2, 240-3, 240-4, and 240-5 (collectively, air streams 240). The first objects 210 may be human-created objects. For example, first object 210-1 may be a building, such as a storage shed. In another example, first objects 210-2, 210-3, and 210-5 may be vehicles, such as cars and trucks. In a third example, first object 210-4 may be a concrete block to park vehicles, such as a parking curb. The second objects 220 may be naturally occurring objects. For example, second object 220-1 may be vegetation, such as a tree. In another example, second object 220-2 may be a geological formation, such as a plurality of rocks and dirt. The first objects 210 and the second objects 220 may stand out or be separated from the environment 205. For example, the second object 220-2 may be generally perpendicular from the surface of the environment 205. The environmental condition 230 may include a localized, or semi-localized, condition that occurs within an atmosphere of the environment 205. For example, the environmental condition 230 may be a haze or dust located in the environment 205 due to a pollutant or other hazardous material. In another example, the environmental condition 230 may be a fog or mist in the environment 205 due to moisture or temperature changes.

The air streams 240 are depicted, in FIG. 2, with dash-dotted lines. The air streams 240 may represent the presence of air in the environment that may be measured by system 200. Specifically, the air streams 240 may include patterns, gusts, winds, breezes, rising, falling, or other air movements. The air streams 240 may be affected by the other objects within the environment 205. For example, air stream 240-1 may be moving due to interacting with second object 220-1. In another example, air stream 240-4 may have a characteristic or pattern due to the lack of objects between first objects 210-3, 210-4, and 210-5. The air streams may have various patterns or characteristics that may be measured, such as temperature, airflow patterns, currents, speeds, directions, and the like. The air streams 240 may be unaffected by certain objects or conditions within the environment 205. For example, airstreams 240-4 and 240-5 may not be altered, may be unchanged, or may flow in the same way as if nothing was there, when flowing through the environmental condition 230. The air streams 240 may be relatively unaffected by certain objects or conditions within the environment 205. For example, airstreams 240-4 and 240-5 may be slowed by no more than three to five percent when passing through environmental condition 230. In another example, airstreams 240-4 and 240-5 may move with the same speed and direction but may include or carry a subset of particulates (e.g., fog, smoke, pollution) of the environmental condition 230.

The system 200 may include the following: a vehicle 250; an AMVN 260; and one or more air generation devices 262.

The vehicle 250 may be an automobile, such as a car or truck. The vehicle 250 may include the following: a plurality of sensors 252; and a guidance subsystem 256. The plurality of sensors 252 may be configured to collect environmental information of the environment 205. For example, the sensors 252 may include visual sensors configured to capture images of environment 205. In another example, the sensors 252 may include GPS sensors configured to locate the vehicle with respect to a generalized position in the environment 205. In some embodiments, the sensors 252 may facilitate communication between other components of system 200. For example, the sensors 252 may include wireless transceivers configured as part of an IoT subsystem. For example, one of the sensors 252 may be an IoT transceiver that is configured to communicate with IoT transceivers 280-1 and 280-2 that are located on first objects 210-1 and 210-5, respectively. The sensors 252 may include a sensor configured to measure air. Specifically, the sensors 252 may include at least one sensor that is configured as a pitot tube. In some embodiments, the sensors 280 may include at least one sensor that is configured as an air measurement sensor. An air measurement sensor of the system 200 may identify various air measurements, such as wind speed, breeze direction, relative air temperature, etc.

The guidance subsystem 254 may be a collection of hardware and software configured to perform various navigation operations. The guidance subsystem 254 may receive environmental information from the sensors 252. The guidance subsystem 254 may operate on a computer, such as computer 100. In some embodiments, the vehicle 250 may be operated by or with some assistance from a user, such as a driver (not depicted). For example, the driver may operate the vehicle 250 by way of input or controls (not depicted) and may receive navigation instructions from the guidance subsystem 254. Continuing the example, the navigation instruction may be for the driver to take a left turn in three hundred feet. In some embodiments, the vehicle 250 may be operated by or with some assistance from the guidance subsystem 254. For example, the vehicle 250 may be an autonomous vehicle, and the guidance subsystem 254 may attempt to perform autonomous movement in response to navigation instructions from the guidance subsystem. Continuing the example, the guidance subsystem 254 may adjust the throttle of vehicle 250 responsive to detecting the first objects 210 and the second objects 220.

The AMVN 260 may direct the autonomous vehicle based on identifying various air measurements within the environment 205. In detail, the AMVN 260 may be a collection of hardware and/or software. The AMVN 260 may be a part of the vehicle 250. In some embodiments, the AMVN 260 may be a part of the guidance subsystem 254. In some embodiments, the AMVN 260 may be a computer that is separate from or a part of a different computing device from the vehicle 250 or the guidance subsystem 254. Specifically, the AMVN 260 may be a computer, such as computer system 100, that may be located in a separate environment (not depicted). For example, the first object 210-1 may be a navigation shed that contains one or more computing devices that are communicatively coupled to the other components of system 200. The one or more computing devices may include software and hardware configured to perform AMVN 260. In a second example, the first object 210-3 may be an autonomous vehicle that includes various circuits configured to execute one or more software routines of AMVN 260.

The AMVN 260 may be configured to identify air measurements of the air streams 240 in the environment 205. Specifically, the AMVN 260 may receive readings from the subset of the sensors 252 (or 280) that are configured to measure the air in the environment (air measurement sensors). Based on the received readings from the subset of the sensors 252, the AMVN may be configured to identify the air measurements. In some embodiments, the AMVN 260 may be configured to identify air measurements that occur naturally within the environment 205. For example, as objects move about in the environment 205, the various air streams 240 may be created or altered. In another example, as various changing weather and/or pollution patterns occur in the environment 205, the various air streams 240 may be created or altered. In either example, the AMVN 260 may identify air measurements from the air streams 240.

In some embodiments, the AMVN 260 may be configured to identify air measurements from air streams 240 that are generated within the environment 205. In detail, the air generation devices 262 may be integrally coupled to the vehicle 250 or to another object in the environment 205. The air generation devices 262 may include, for example, fans, compressors, bellows, spouts, vacuums, pneumatics, or other relevant devices configured to disturb or move air. At 270 the air generation devices 262 may generate or disturb air in the environment that may create one or more of the air streams 240. The air generation devices 262 may generate air conditionally. In detail, if air streams 240 are occurring in the environment 205 but are not occurring at a detectable level, the AMVN 260 may enable operation of the air generation devices 262 to generate air streams 240 adjacent to the vehicle 250.

The air generation devices 262 may be configured to generate air that differs by some measurable amount from other air. For example, the air generation devices 262 may include a fan with an integrated heating element (not depicted). Continuing the example, the air generation device 262 may heat and propel air, at 270, that creates air stream 240-3 with a differing temperature from air streams 240-1, 240-2, 240-4, and 240-5. In another example, the air generation devices 262 may include a compressor and a canister of a mixture of detectable chemicals. The air generation devices 262 may distribute air, at 270, that creates air stream 240-1 with a differing chemical makeup from air streams 240-2 through 240-5. Other air generation techniques may be contemplated by the air generation devices 262. For example, air generation devices 262 that release aerosol dye colors that create air colors that are identifiable. In another example, air generation devices 262 that introduce temporal lags to create air patterns that are identifiable.

The AMVN 260 may be configured to analyze the identified air measurements to identify relative position and distance of various objects within the environment 205. The analysis may be based on performing time delay identification, such as how long it takes for an air stream 240 to move about the environment 205 before being reflected and returning to the sensors 252. For example, by identifying walls and parked cars within environment 205 or other objects. The analysis may be based on performing a pattern identification, such as pattern and direction identification of the air streams 240. The analysis may be based on recording historical air measurements of various areas and creating tables of key-value pairs that relate an air measurement with an object, such as size, shape, and distance from the air measurement.

In some embodiments, to identify objects in the environment 205, the AMVN 260 may execute machine learning on data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The AMVN 260 may be configured to direct autonomous movement operations of the vehicle 250. Specifically, the identified air measurements may be used by the AMVN 260 to direct autonomous movement of the vehicle 250 in the environment 205. For example, the air measurements may be based on the air streams 240 as they are affected by the one or more first objects 210 and second objects 220. Air stream 240-1 may be due to vehicle 250 being adjacent to the second object 220-1. Consequently, the AMVN 260 may identify from the air measurements the distance between the second object 220-1 and the vehicle 250. In response to the AMVN 260 determining relative positions of objects (and consequently, distances between various objects) in the environment 205, the AMVN may direct autonomous movement. For example, based on air stream 240-1, the AMVN 260 may instruct the vehicle to steer to the left away from the second object 220-1.

The AMVN 260 may direct autonomous movement spontaneously, such as when the vehicle 250 has never been to the environment 205 before. The AMVN 260 may direct autonomous movement based on past air measurements identified in the environment (e.g., historical patterns). In detail, the AMVN 260 may generate a mapping or air-based map of the environment 205. The air-based map may be generated at a time when the vehicle was able to successfully move through the environment 205 without the help of the AMVN 260. For example, a user and/or the guidance system 254 may operate the vehicle 250 and successfully traverse the environment 205 without colliding with the first objects 210 or the second objects 220. Continuing the example, during the operation the AMVN 260 may passively collect air measurements in the environment 205. The AMVN 260 may generate the air-based map that includes patterns, speeds, directions, currents, temperatures, composition, or other relevant environmental information that relates to air in the environment 205. The AMVN may correlate air measurements with visualizations in the surroundings, such as from a sensor that is an image sensor (e.g., a camera feed). The AMVN 260 may identify, for example, specific patterns of airflow in the surrounding and associate them with open spaces, blockages, and other terrain characteristics for later usage.

Figure 3:
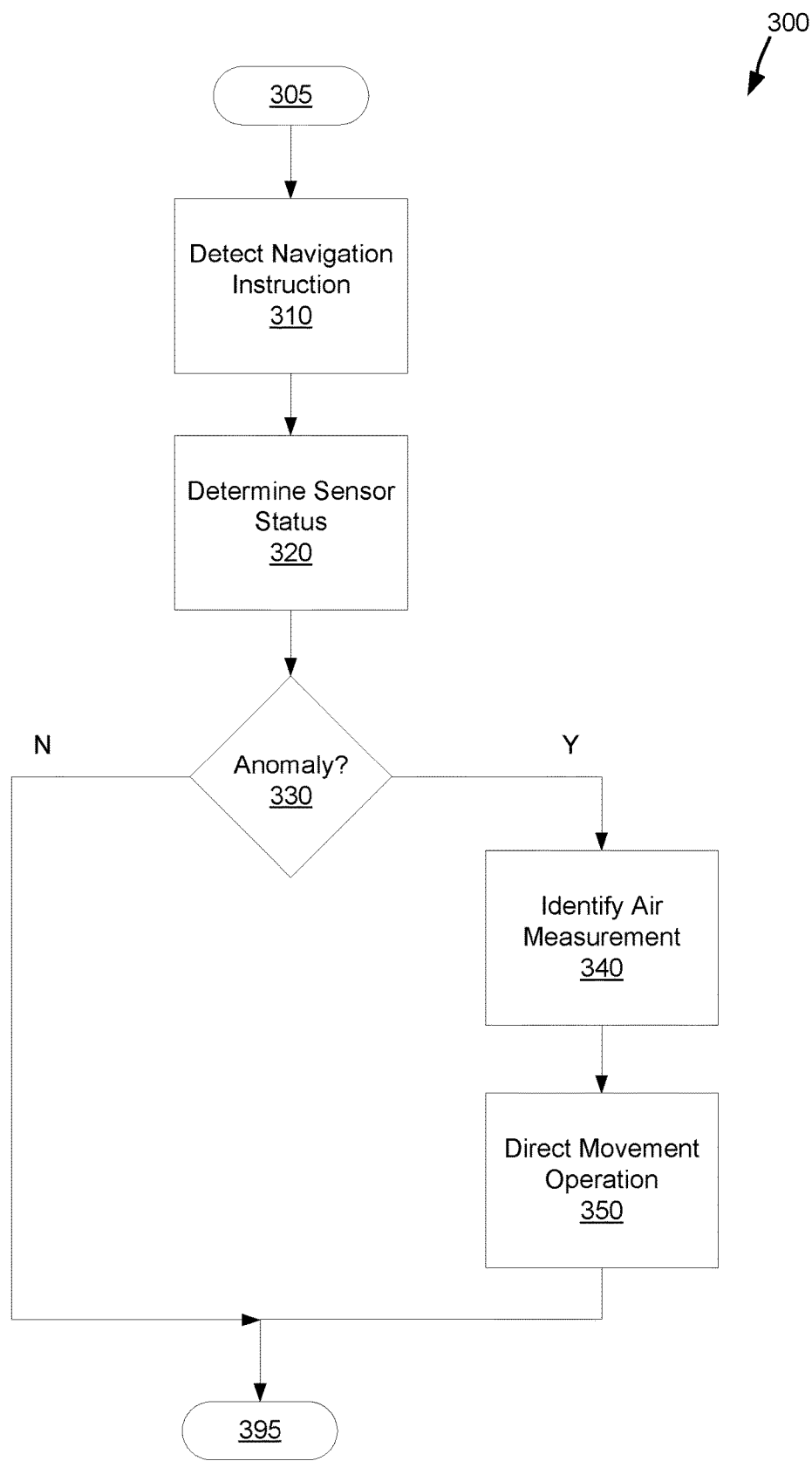
FIG. 3 depicts a method of vehicular navigation, consistent with some embodiments of the disclosure.

FIG. 3 depicts a method 300 of vehicular navigation, consistent with some embodiments of the disclosure. Specifically, method 300 may be performed by a system for operating a vehicle, such as by vehicle 250 or by AMVN 260 of system 200. The method 300 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit, microcontroller, etc.).

From start 305, a navigation instruction may be detected at 310. The navigation instruction may be of an autonomous vehicle. For example, an autonomous vehicle may direct itself to drive forward without hitting any objects. The navigation instruction may be from a user. For example, a user may instruct a vehicle to drive from a starting position to a destination.

At 320, a sensor status may be determined. The sensor status may be determined from a plurality of sensors that are communicatively coupled to the vehicle. For example, the sensors may include cameras, LIDAR, GPS, or other vehicle integrated sensors. In another example, the sensors may be adjacent to the vehicle during navigation and movement of the vehicle. Specifically, the sensors may be integrated into other vehicles that are around the vehicle or integrated into structures such as street signs. The plurality of sensors may be configured to capture environmental information of an environment of the vehicle. For example, sensors that are cameras may be configured to capture two-dimensional and three-dimensional image data of the environment adjacent to the vehicle.

The sensors status may be that the sensors are functioning properly. The sensor status may be that the sensors are anomalous, or not functioning properly. An anomalous sensor status may be that a sensor is no longer functioning at all, such as a disconnect in receiving LIDAR signals from a LIDAR sensor. An anomalous sensor status may be that a sensor is operating at a degraded or reduced level. For example, a sensor may be a thermal camera and the thermal camera may be operating with reduced thermal definition. An anomalous sensor status may be a reduction in functionality below a predetermined threshold. For example, an autonomous vehicle may be able to correctly identify the shape, size, and placement of objects within a thirty-five feet radius on all sides. An anomalous sensor status may include a predefined threshold of eighteen feet for the identification and placement of all objects adjacent to the autonomous vehicle. For example, if the autonomous vehicle is only able to identify objects within a twelve feet radius around the vehicle, then an anomalous sensor status may be identified.

If an anomalous sensor status is identified (at 330:Y), then an air measurement may be identified at 340. The air measurement may be identified by one of the plurality of sensors. Specifically, one or more sensors that are communicatively coupled to the vehicle may be sensors configured to capture and/or identify one or more air measurements, such wind speed, air pressure, temperature, etc. The identification of the air measurement may include performing analysis on the air measurements.

At 350, autonomous movement operations may be directed. The autonomous movement operation may be directed based on the air measurements. The autonomous movement operation may be in response to the navigation instruction. For example, in response to a navigation instruction to move forward in an environment, the autonomous movement operation may be based on air measurements in the environment.

After the directed autonomous movement operation at 350, or if there is no anomalous sensor status identified (at 330:N), then method 500 may end at 395.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   receiving a navigation instruction of an autonomous vehicle in an environment, the autonomous vehicle communicatively coupled to a plurality of sensors configured to capture environmental information of the environment;
   determining, based on the plurality of sensors, an anomalous sensor status of a first sensor of the plurality of sensors;
   directing, in response to the anomalous sensor status, an air stream to be generated adjacent to the autonomous vehicle;
   receiving, from a second sensor of the plurality of sensors, an air measurement from the air stream adjacent to the autonomous vehicle;
   determining, based on the air measurement, a relative position of an object in the environment; and
   directing, in response to the navigation instruction and based on the relative position, autonomous movement operation of the autonomous vehicle.

2. The method of claim 1, wherein
   the plurality of sensors includes one or more sensors that are attached to the autonomous vehicle, and
   the first sensor is one of the one or more sensors.

3. The method of claim 2, wherein the first sensor is a global positioning sensor and the environmental information is a location of the autonomous vehicle.

4. The method of claim 2, wherein the first sensor is an electromagnetic sensor, configured to sense electromagnetic waves of the environment.

5. The method of claim 2, wherein the first sensor is a visible light sensor configured to sense visible light of the environment.

6. The method of claim 1, wherein the first sensor is located on another vehicle in the environment.

7. The method of claim 1, wherein the anomalous sensor status is that the first sensor is unable to capture the environmental information of the environment.

8. The method of claim 1, wherein the anomalous sensor status is that the first sensor is able to capture environmental information that is degraded beyond a predetermined threshold.

9. The method of claim 1, wherein the autonomous vehicle includes one or more air generation devices, and wherein the air stream is generated by the one or more air generation devices.

10. The method of claim 1, wherein the air measurement is selected from the group consisting of an air speed, an air temperature, an airflow, an airflow pattern, and an air direction.

11. The method of claim 1, wherein:
    the air measurement is based on a reflected airflow from one or more objects adjacent to the autonomous vehicle;
    in response to the directing the air stream to be generated, an air projection device coupled to the autonomous vehicle generates an airflow from the vehicle; and
    the determining the relative position comprises measuring, based on the generated airflow, the reflected airflow.

12. The method of claim 1, wherein the method further comprises:
    receiving, before the navigation instruction, a set of sensor data from the first sensor and a set of sensor data from the second sensor;
    recording air measurements from the set of sensor data from the second sensor; and
    associating the recorded air measurements with environmental information from the set of sensor data from the first sensor.

13. The method of claim 12, wherein the associating includes generating an air-based map of the environment.

14. The method of claim 13, wherein the determining the relative position comprises:
    comparing, the air measurement with the air-based map of the environment.

15. A system, the system comprising:
    a memory, the memory containing one or more instructions; and
    a processor, the processor communicatively coupled to the memory, the processor, in response to reading the one or more instructions, configured to:
    receive a navigation instruction of an autonomous vehicle in an environment, the autonomous vehicle communicatively coupled to a plurality of sensors configured to capture environmental information of the environment;
    determine, based on the plurality of sensors, an anomalous sensor status of a first sensor of the plurality of sensors;
    direct, in response to the anomalous sensor status, an air stream to be generated adjacent to the autonomous vehicle;
    receive, from a second sensor of the plurality of sensors, an air measurement from the air stream adjacent to the autonomous vehicle;
    determine, based on the air measurement, a relative position of an object in the environment; and
    direct, in response to the navigation instruction and based on the relative position, autonomous movement operation of the autonomous vehicle.

16. The system of claim 15, wherein the processor is further configured to:
    receive, before the navigation instruction, a set of sensor data from the first sensor and a set of sensor data from the second sensor,
    record air measurements from the set of sensor data from the second sensor; and associate the recorded air measurements with environmental information from the set of sensor data from the first sensor.

17. The system of claim 16, wherein the associating includes generating an air-based map of the environment.

18. A computer program product, the computer program product comprising:
one or more computer readable storage media; and
program instructions collectively stored on the one or more computer readable storage media, the program instructions configured to:
receive a navigation instruction of an autonomous vehicle in an environment, the autonomous vehicle communicatively coupled to a plurality of sensors configured to capture environmental information of the environment;
determine, based on the plurality of sensors, an anomalous sensor status of a first sensor of the plurality of sensors;
direct, in response to the anomalous sensor status, an air stream to be generated adjacent to the autonomous vehicle;
receive, from a second sensor of the plurality of sensors, an air measurement from the air stream adjacent to the autonomous vehicle;
determine, based on the air measurement, a relative position of an object in the environment; and
direct, in response to the navigation instruction and based on the relative position, autonomous movement operation of the autonomous vehicle.

19. The computer program product of claim 18, wherein the plurality of sensors includes one or more sensors that are attached the autonomous vehicle, and the first sensor is one of the one or more sensors.

20. The computer program product of claim 18, wherein the air measurement is selected from the group consisting of an air speed, an air temperature, and an air direction.

* * * * *